US010145451B2

(12) United States Patent
Pyrhonen et al.

(10) Patent No.: US 10,145,451 B2
(45) Date of Patent: Dec. 4, 2018

(54) MAGNETIC ACTUATOR AND A GEAR SYSTEM COMPRISING THE SAME

(71) Applicant: Saimaan ammattikorkeakoulu Oy, Lappeenranta (FI)

(72) Inventors: Juha Pyrhonen, Lappeenranta (FI); Juho Montonen, Lappeenranta (FI); Simo Sinkko, Lappeenranta (FI); Tommi Nummelin, Lappeenranta (FI)

(73) Assignee: SAIMAAN AMMATTIKORKEAKOULU OY, Lappeenranta (FI)

( * ) Notice: Subject to any disclaimer, the term of this patent is extended or adjusted under 35 U.S.C. 154(b) by 277 days.

(21) Appl. No.: 15/248,648

(22) Filed: Aug. 26, 2016

(65) Prior Publication Data

US 2017/0067540 A1  Mar. 9, 2017

(30) Foreign Application Priority Data

Sep. 4, 2015  (EP) .................................... 15183901

(51) Int. Cl.
*F16H 3/08* (2006.01)
*F16D 27/00* (2006.01)
(Continued)

(52) U.S. Cl.
CPC ............. *F16H 3/089* (2013.01); *F16D 11/10* (2013.01); *F16D 27/004* (2013.01);
(Continued)

(58) Field of Classification Search
CPC .......... F16H 3/089; F16H 3/08; F16H 63/304; F16D 11/10; F16D 27/004
(Continued)

(56) References Cited

U.S. PATENT DOCUMENTS 2,969,134 A * 1/1961 Wiedmann .............. F16D 27/09
192/108
4,509,629 A * 4/1985 Pajgrt .................... D03D 51/00
192/48.91

(Continued)

FOREIGN PATENT DOCUMENTS

DE 10 2012 209303 A1 12/2013
WO 2007/034195 A1 3/2007

OTHER PUBLICATIONS

EP Search Report, dated Feb. 22, 2016, from corresponding EP application.

*Primary Examiner* — Ha Dinh Ho
(74) *Attorney, Agent, or Firm* — Young & Thompson

(57) ABSTRACT

A magnetic actuator includes a collar element (101) and a toroidal coil (103) surrounding the collar element. The collar element is coupled in a torque transferring way to a shaft (108) surrounded by the collar element. The collar element is capable of sliding in the axial direction with respect to the shaft. The collar element includes indentations (102) for locking in a torque transferring way to a counter-part when the collar element is in a first axial position. The collar element includes permanent magnet material (104) for generating an axial force for moving the collar element to the first axial position when the toroidal coil carries electric current flowing in a first direction and to a second axial position when the toroidal coil carries electric current flowing in an opposite direction. Thus, no mechanical elements are needed for moving the collar element in the axial direction.

9 Claims, 6 Drawing Sheets

(51) Int. Cl.
*F16H 3/089* (2006.01)
*F16D 11/10* (2006.01)
*F16D 27/108* (2006.01)
*F16D 27/14* (2006.01)
*F16H 63/30* (2006.01)
*H01F 7/16* (2006.01)
*F16D 27/118* (2006.01)

(52) U.S. Cl.
CPC .......... *F16D 27/108* (2013.01); *F16D 27/118* (2013.01); *F16D 27/14* (2013.01); *F16H 3/08* (2013.01); *F16H 63/304* (2013.01); *H01F 7/1646* (2013.01); *B60Y 2400/421* (2013.01); *F16H 2063/3093* (2013.01)

(58) Field of Classification Search
USPC .......................................................... 74/335
See application file for complete search history.

(56) References Cited

U.S. PATENT DOCUMENTS

| | | | |
|---|---|---|---|
| 5,827,148 A | 10/1998 | Seto et al. | |
| 7,128,032 B2 * | 10/2006 | Froeschle | F02D 41/20 123/90.11 |
| 7,201,096 B2 * | 4/2007 | Cetinkunt | H01F 7/1615 137/625.64 |
| 9,422,988 B2 * | 8/2016 | Beesley | F16D 11/14 |
| 9,518,623 B2 * | 12/2016 | Mastie | F16D 27/118 |
| 9,874,252 B2 * | 1/2018 | Kimes | F16D 23/02 |
| 2002/0008601 A1 | 1/2002 | Yajima et al. | |

* cited by examiner

MAGNETIC ACTUATOR AND A GEAR SYSTEM COMPRISING THE SAME

FIELD OF THE DISCLOSURE

The disclosure relates to a magnetic actuator that can be, for example but not necessarily, a part of a gear-shifter of a gear system capable of producing mutually different gear ratios. Furthermore, the disclosure relates to a gear system comprising at least one magnetic actuator for controlling the gear system to produce a desired one of selectable gear ratios.

BACKGROUND

In many applications there is a need for a coupling arrangement with the aid of which it is possible to couple and decouple rotating objects. Without limiting the generality and merely for exemplifying purposes we consider a gear system that comprises a first shaft provided with first gear wheels and a second shaft provided with second gear wheels. Each of the second gear wheels is capable of transferring torque to and from the second shaft and meshes with a corresponding one of the first gear wheels. In this exemplifying case, the gear ratio between the above-mentioned first and second shafts can be selected by locking a desired one of the first gear wheels in a torque transferring way to the first shaft and by allowing the other one or ones of the first gear wheels to rotate freely with respect to the first shaft. Therefore, there is a need for a coupling arrangement with the aid of which a desired one of the first gear wheels can be locked to the first shaft in a torque transferring way whereas the other one or ones of the first gear wheels is/are freely rotating.

A traditional coupling arrangement comprises typically collar elements each of which is capable of transferring torque to and from the first shaft and capable of sliding in the axial direction with respect to the first shaft. Each collar element comprises indentations, e.g. dog clutch teeth, capable of locking to corresponding indentations of one of the first gear wheels in a torque transferring way. Furthermore, the coupling arrangement may comprise synchronizing means, such as e.g. cone clutches, for synchronizing the rotation speeds of an appropriate gear wheel and an appropriate collar element prior to forming the torque transferring coupling between the gear wheel and the collar element under consideration. Typically, the coupling arrangement further comprises gear-shift forks for moving the collar elements in the axial direction. The outer surface of each collar element has typically a circumferential slot for the corresponding gear-shift fork. The gear-shift forks can be operated with mechanical, hydraulic, pneumatic, and/or electrical means so as to have a desired gear ratio in each situation.

A coupling arrangement of the kind described above is, however, not free from challenges. One of the challenges is related to the need to arrange the gear-shift forks so that the force directed by a gear-shift fork to a collar element is so axially directed and so symmetric with respect to the shaft that the gear-shift fork does not tend to twist the collar element. Furthermore, in some cases, the friction between the collar element and the gear-shift fork may be problematic as there can be a significant speed difference between contacting surfaces of the collar element and the gear-shift fork and thereby even a moderate friction force may correspond to a significant instantaneous heating power.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the invention, there is provided a new magnetic actuator that can be, for example but not necessarily, a part of a gear-shifter of a gear system capable of producing mutually different gear ratios.

A magnetic actuator according to the invention comprises a collar element capable of transferring torque to and from a shaft surrounded by the collar element and capable of sliding in the axial direction with respect to the shaft. The collar element comprises indentations for locking in a torque transferring way to a counterpart, e.g. a gear wheel, when the collar element is in a first axial position with respect to the shaft. The magnetic actuator further comprises a coil surrounding the collar element so as to generate a circumferential current density, wherein the collar element is capable of moving in the axial direction with respect to the coil. The collar element comprises permanent magnet material for generating an axial force for moving the collar element to the first axial position when the coil carries electric current flowing in a first direction and to a second axial position when the coil carries electric current flowing in a second direction opposite to the first direction.

As the collar element is operated with the aid of the axial force generated by the permanent magnet material and the electric current carried by the coil, no mechanical means are needed for moving the collar element in the axial direction.

In accordance with the invention, there is provided also a new gear system that comprises:
  a gear-wheel assembly capable of producing gear ratios that are different from each other, and
  at least one magnetic actuator according to the invention for controlling the gear-wheel assembly to produce a selected one of the gear ratios.

A number of exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

Exemplifying and non-limiting embodiments of the invention and their advantages are explained in greater detail below in the sense of examples and with reference to the accompanying drawings, in which.

DESCRIPTION OF EXEMPLIFYING AND NON-LIMITING EMBODIMENTS

The specific examples provided in the description below should not be construed as limiting the scope and/or the applicability of the accompanied claims. Lists and groups of examples provided in the description are not exhaustive unless otherwise explicitly stated.

Figure 1A:
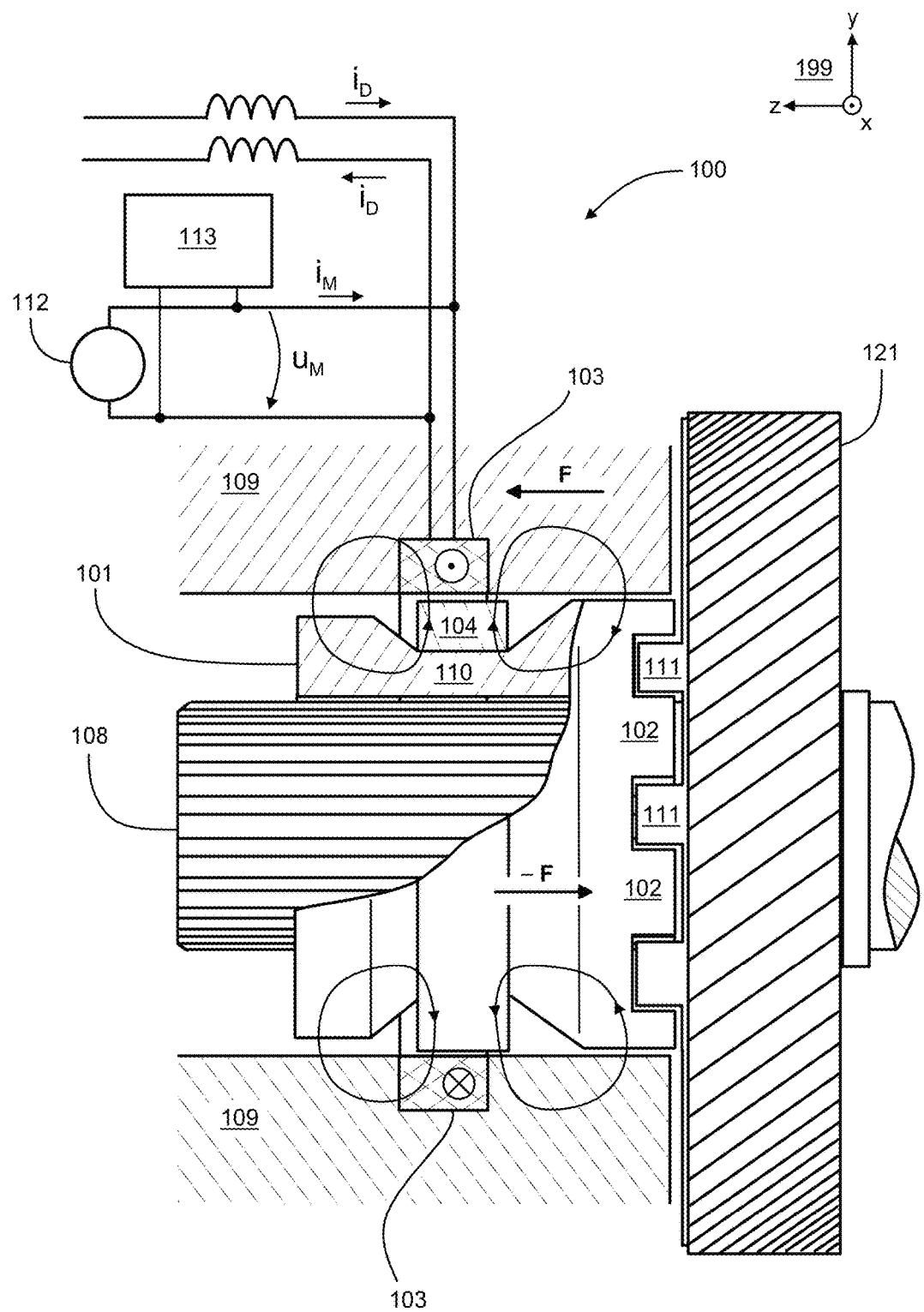
FIGS. 1a, 1b, and 1c illustrate a magnetic actuator according to an exemplifying and non-limiting embodiment of the invention.
Figure 1B:
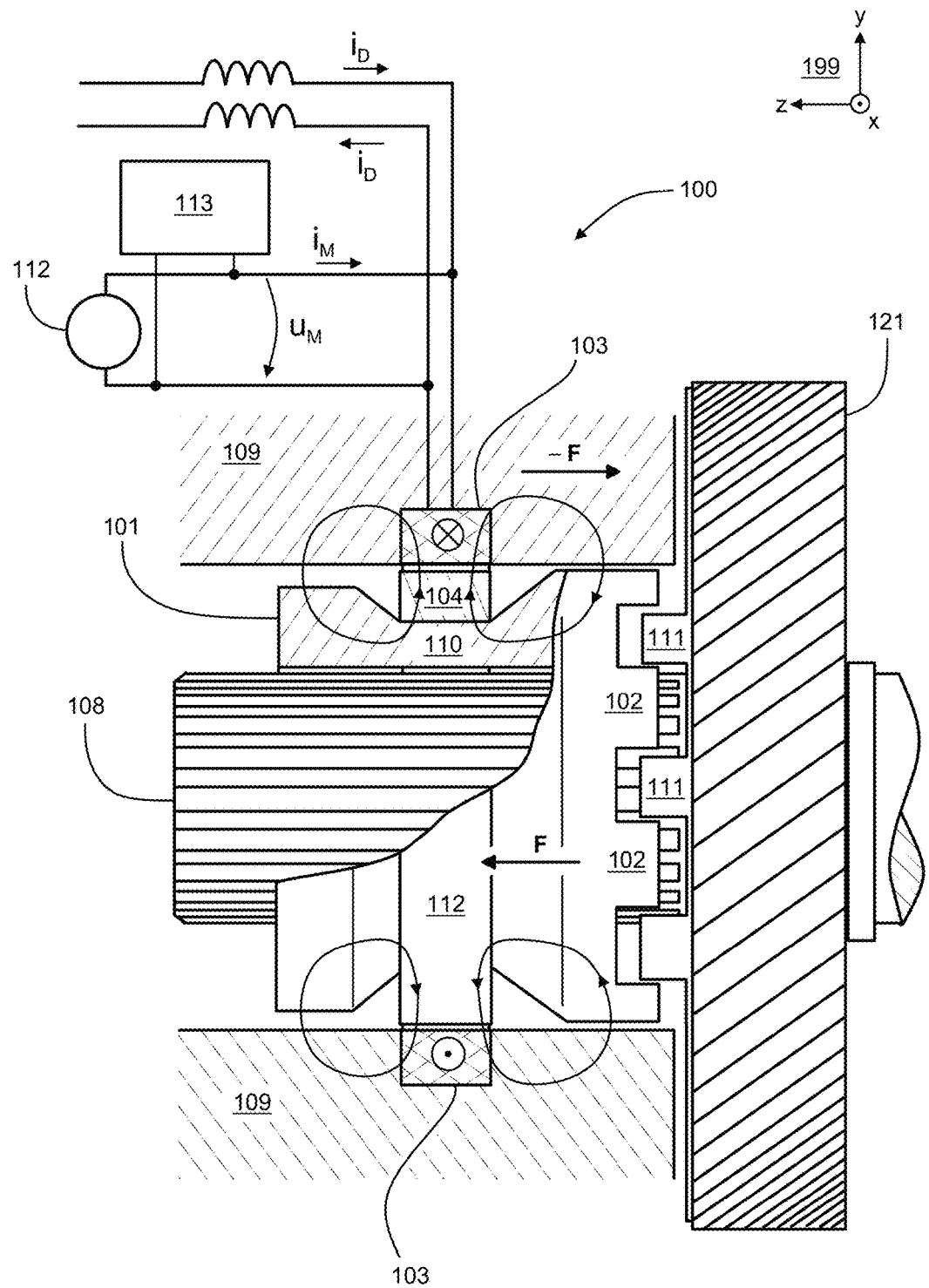
Figure 1C:
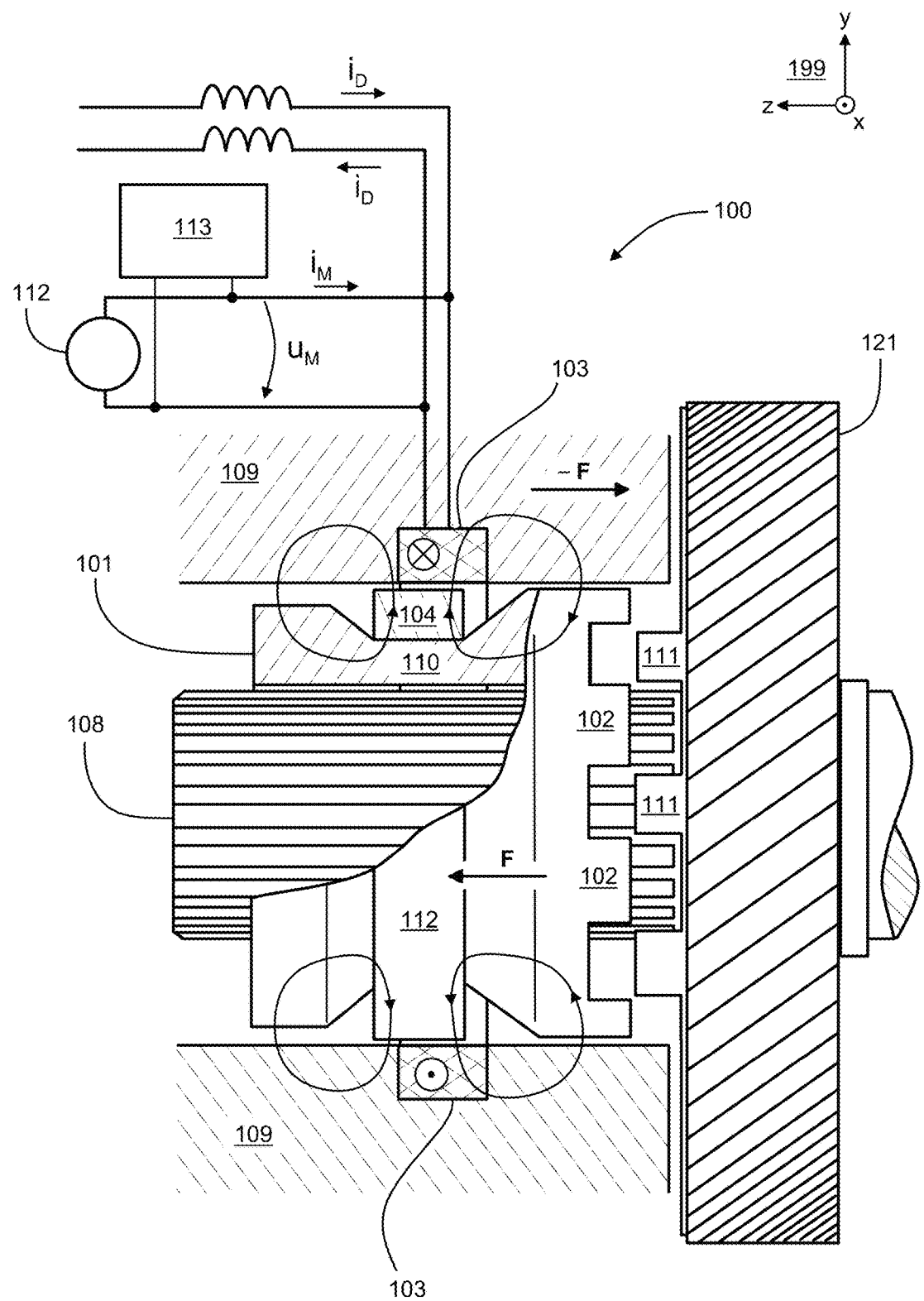

FIGS. 1a, 1b and 1c illustrate a magnetic actuator 100 according to an exemplifying and non-limiting embodiment of the invention. The magnetic actuator comprises a collar element 101 capable of transferring torque to and from a shaft 108 that is surrounded by the collar element. Furthermore, the collar element 101 is capable of sliding in the axial direction with respect to the shaft 108. In FIGS. 1a-1c, the axial direction is parallel with the z-axis of a coordinate system 199. The bore of the collar element 101 may comprise for example spline teeth for matching corresponding spline teeth provided on the outer periphery of the shaft 108. It is also possible to use other means which provide torque transferring relation between the shaft and the collar element and which allow the collar element to move axially with respect to the shaft. For example, the bore of the collar element and the outer periphery of the shaft can be provided with axial slots and there can be wedges in the slots so as to connect the collar element and the shaft in a torque transferring way. In FIGS. 1a-1c, the collar element 101 is shown as a partial section view where the section plane is parallel with the yz-plane of the coordinate system 199. The collar element 101 comprises indentations for locking in a torque transferring way to a counterpart 121 when the collar element is in an appropriate axial position with respect to the counterpart. In FIGS. 1a-1c, two of the indentations of the collar element 101 are denoted with a reference number 102. In the exemplifying case shown in FIGS. 1a-1c, the counterpart 121 is a gear wheel and two of the indentations of the counterpart 121 are denoted with a reference number 111. The magnetic actuator further comprises a coil 103 surrounding the collar element. In FIGS. 1a-1c, the coil 103 and a frame structure 109 supporting the coil are shown as section views where the section plane is parallel with the yz-plane of the coordinate system 199.

The collar element 101 comprises permanent magnet material 104 for generating axial force acting on the collar element when the coil 103 carries electric current. The permanent magnet material 104 can be for example Neodymium-iron-boron "NIB", samarium-cobalt "SmCo", or some other suitable permanent magnet material. In FIGS, 1a-1c, exemplifying flux-lines of the magnetic flux generated by the permanent magnet material 104 are depicted with closed curves provided with arrow heads. The force density f, $N/m^3$, is j×B, where j is the electric current density, $A/m^2$, and B is the magnetic flux density, $Vs/m^2$. As can be seen from FIGS. 1a-1c, the magnetic flux density directed by the permanent magnet material to the coil 103 is substantially radial and the current density in the coil is circumferential. Thus, the force density is substantially axial and thereby the mutually opposite forces F and −F acting on the frame structure 109 and on the collar element 101 are substantially axial. FIG. 1a illustrates an exemplifying situation where the collar element 101 is in a first axial position so that the collar element is coupled in a torque transferring way with the counterpart 121 and where the electric current flows in a first direction and thus the axial force acting on the collar element is in the negative z-direction of the coordinate system 199. FIG. 1b illustrates an exemplifying situation where the electric current flows in a second direction opposite to the first direction and thus the axial force acting on the collar element 101 is in the positive z-direction of the coordinate system 199 and where the collar element has moved in the positive z-direction from the first axial position shown in FIG. 1a. FIG. 1c illustrates an exemplifying situation where the electric current flows in the second direction and thus the axial force acting on the collar element 101 is in the positive z-direction and where the collar element is no longer in the torque transferring relation with the counterpart 121.

In the exemplifying magnetic actuator illustrated in FIGS. 1a-1c, the permanent magnet material 104 has radially directed magnetization and the permanent magnet material is arranged to coaxially surround the axis of rotation of the collar element 101 and of the shaft 108. Thus, the magnetic flux density distribution is substantially rotationally symmetric with respect to the axis of rotation. A radially symmetric magnetic flux density distribution is advantageous in the respect that it does not cause magnetic flux density variations in the frame structure 109 when the shaft and the collar element are rotating. Magnetic flux density variations are undesirable as they would cause hysteresis and/or eddy current losses in the frame structure 109.

Figure 2:
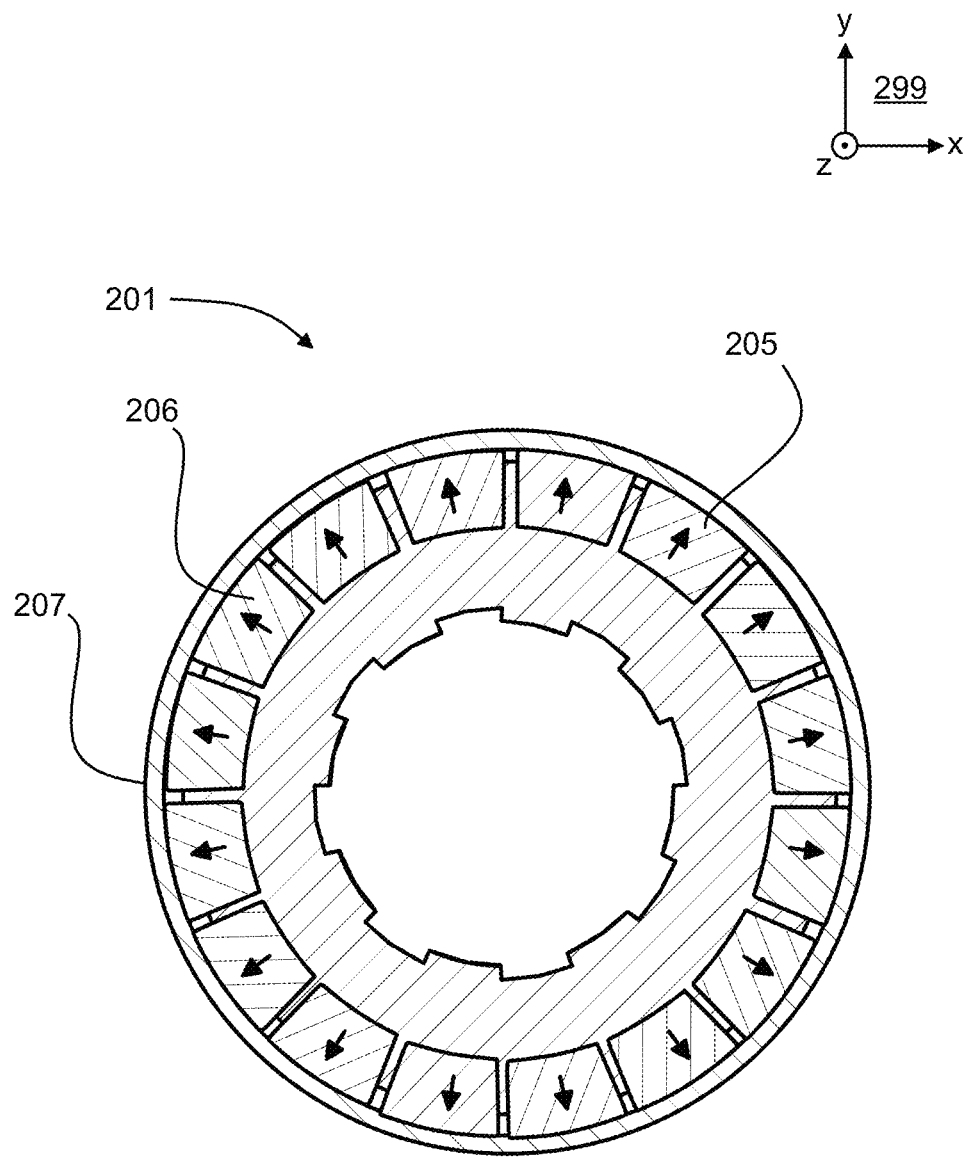
FIG. 2 illustrates a detail of a magnetic actuator according to an exemplifying and non-limiting embodiment of the invention.

FIG. 2 illustrates a permanent magnet arrangement of a collar element 201 of a magnetic actuator according to an exemplifying and non-limiting embodiment of the invention. FIG. 2 shows a section view of the collar element so that the section plane is perpendicular to the axis of rotation of the collar element and to the z-axis of a coordinate system 299. In this exemplifying case, the permanent magnet material constitutes separate pieces two of which are denoted with reference numbers 205 and 206 in FIG. 2. Each piece of the permanent magnet material has a radial direction of magnetization. In FIG. 2, the directions of magnetizations of the pieces are denoted with arrows. In this exemplifying case, the collar element 201 further comprises a support ring 207 that is advantageously made of ferro-magnetic material in order to smooth the magnetic flux density distribution in the circumferential direction.

It is worth noting that the above-presented radially magnetized permanent magnet material is not the only possible arrangement for producing a magnetic flux that is radially directed to the coil. For another example, it is also possible to use axially magnetized permanent magnet material and to provide the collar element with suitable ferromagnetic flux guiding portions so that the flux guiding portions direct the magnetic flux radially to the coil.

In the exemplifying magnetic actuator illustrated in FIGS. 1a-1c, the reluctance of a magnetic circuit comprising the permanent magnet material 104 is dependent on the axial position of the collar element 101. This can be implemented for example so that the magnetic permeability μ of the material of the frame structure 109 is greater than the magnetic permeability of the coil 103. In the situation shown in FIG. 1b, the reluctance is at its maximum because the permanent magnet material 104 and coil 103 are aligned with each other. In the axial positions shown in FIGS. 1a and 1c, there are minima of the reluctance and thus the collar element 101 is retained at each of the axial positions shown in FIGS. 1a and 1c by the permanent magnet material when there is no electric current in the coil 103. Thus, no electric current is needed for retaining the collar element 101 at each of the axial positions shown in FIGS. 1a and 1c.

Figure 4:
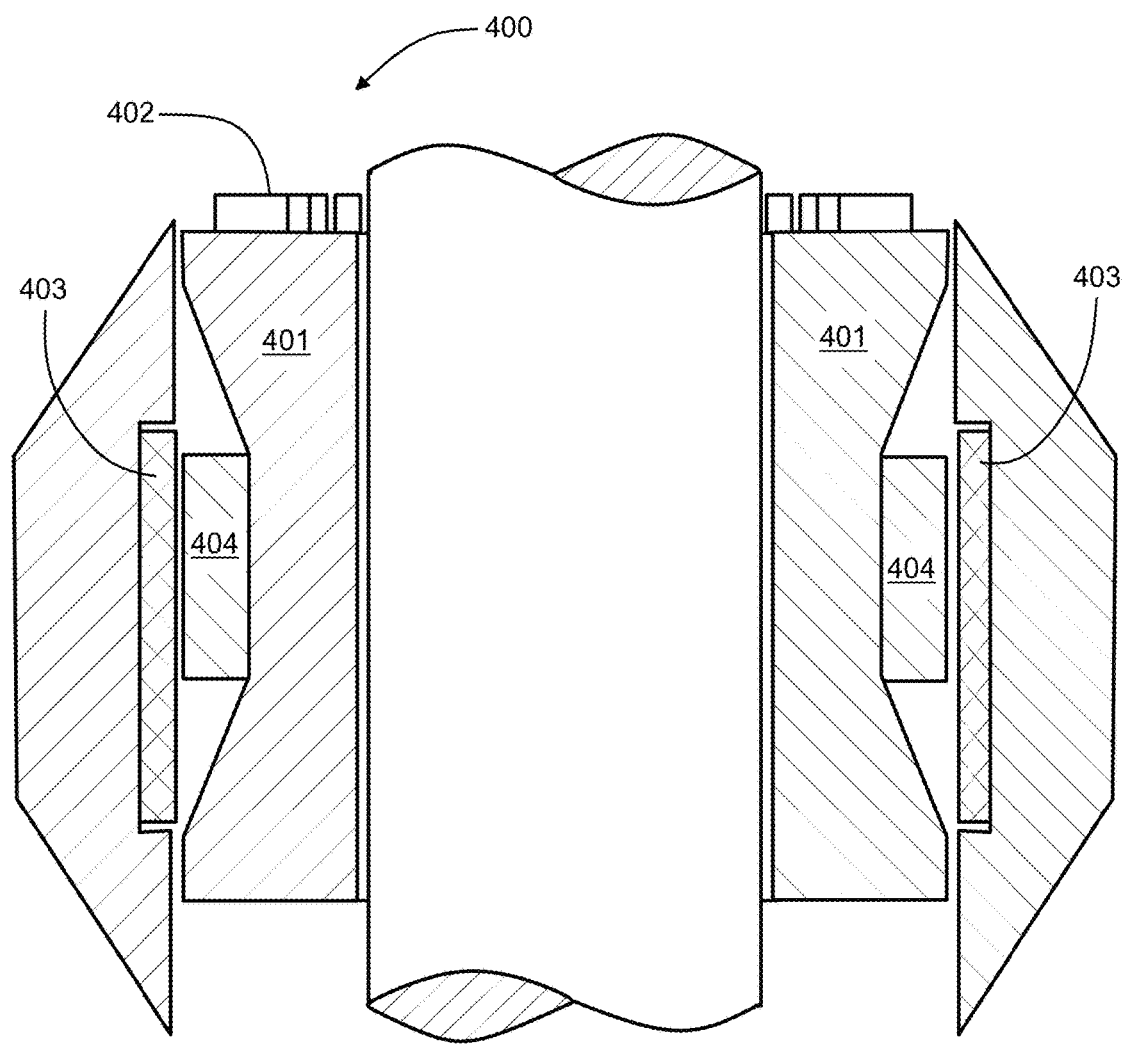
FIG. 4 illustrates a magnetic actuator according to an exemplifying and non-limiting embodiment of the invention.

FIG. 4 illustrates a magnetic actuator 400 according to an exemplifying and non-limiting embodiment of the invention. The magnetic actuator 400 comprises a collar element 401, a coil 403, and permanent magnet material 404. The collar element comprises indentations 402 for locking in a torque transferring way to a counterpart when the collar element is in a first axial position with respect to a shaft. The counterpart is not shown in FIG. 4. The magnetic actuator 400 operates in the above-described way so that no electric current is needed for retaining the collar element 401 in each of two pre-determined axial positions one of which is the above-mentioned first axial position.

In the exemplifying magnetic actuator illustrated in FIGS. 1a-1c, the reluctance of a magnetic circuit conducting the magnetic flux produced by the electric current of the coil 103 is dependent on the axial position of the collar element 101. This can be implemented for example so that the magnetic permeability of the material of a body 110 of the collar element 101 and the magnetic permeability of the material of the frame structure 109 are greater than the magnetic permeability of air, and the air-gap between the body 110 and the frame structure 119 is non-constant in the axial direction. The magnetic actuator comprises a supply device 112 for supplying measurement electric current $i_M$ to the coil 103 and a processing system 113 for detecting the axial position of the collar element 101 on the basis of the impedance constituted by the coil 103 to the measurement electric current. In FIGS. 1a-1c, the electric current used for moving the collar element 101 in the axial direction is denoted as $i_D$.

The impedance of the coil 103 is dependent on the axial position of the collar element 101 because the above-mentioned reluctance is dependent on the axial position and thereby the inductance of the coil 103 is dependent on the axial position of the collar element. The measurement electric current $i_M$ can be sinusoidal or non-sinusoidal. In an exemplifying case where the measurement electric current $i_M$ is not sinusoidal, the supply device 112 is configured to generate measurement voltage $u_M$ comprising one or more square-form voltage pulses. In this exemplifying case, the processing system 113 can be configured to detect the axial position of the collar element 101 on the basis of the rate of change of the measurement electric current $i_M$ after each rising or falling edge of the measurement voltage $u_M$.

The processing system 113 can be implemented with one or more processor circuits, each of which can be a programmable processor circuit provided with appropriate software, a dedicated hardware processor such as, for example, an application specific integrated circuit "ASIC", or a configurable hardware processor such as, for example, a field programmable gate array "FPGA".

Figure 3:
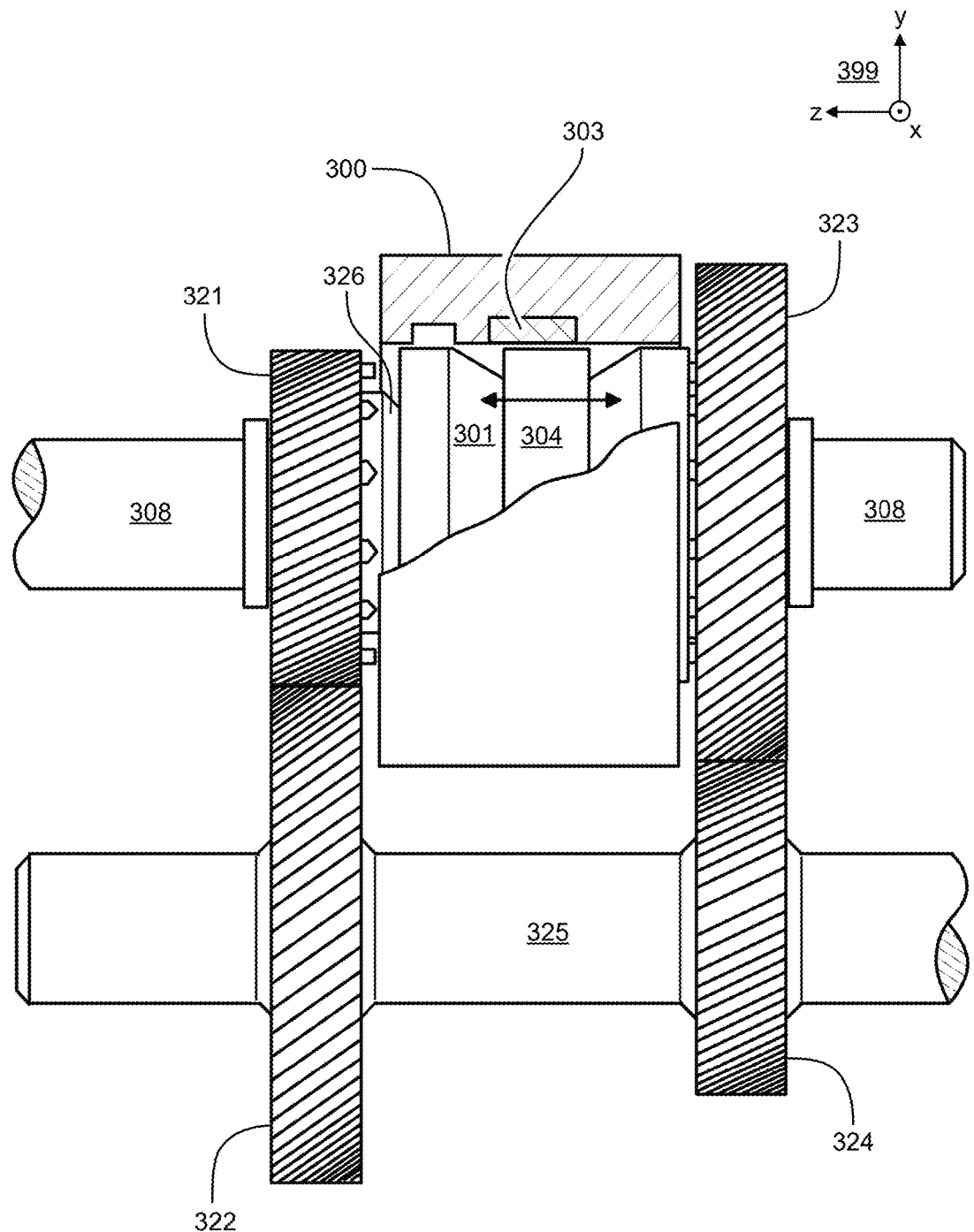
FIG. 3 illustrates a gear system according to an exemplifying and non-limiting embodiment of the invention.

FIG. 3 illustrates a gear system according to an exemplifying and non-limiting embodiment of the invention. The gear system comprises a gear-wheel assembly capable of producing mutually different selectable gear ratios. The gear system comprises a magnetic actuator 300 for controlling the gear-wheel assembly to produce a desired one of the selectable gear ratios. In this exemplifying case, the gear-wheel assembly comprises a first shaft 308 provided with first gear wheels 321 and 323 and a second shaft 325 provided with second gear wheels 322 and 324. Each of the second gear wheels 322 and 324 is capable of transferring torque to and from the second shaft 325 and meshes with a corresponding one of the first gear wheels 321 and 323. The magnetic actuator 300 is suitable for determining which one of the first gear wheels is capable of transferring torque to and from the first shaft 308. The magnetic actuator comprises a collar element 301 that is capable of transferring torque to and from the first shaft 308 and sliding in the axial direction with respect to the first shaft. The axial direction is parallel with the z-axis of a coordinate system 399. The collar element 301 comprises indentations for locking in a torque transferring way to corresponding indentations of the gear wheel 321 when the collar element is in a first axial position and for locking in a torque transferring way to corresponding indentations of the gear wheel 323 when the collar element is in a second axial position. The magnetic actuator 300 comprises a coil 303 and the collar element comprises permanent magnet material 304 for generating an axial force for moving the collar element to the first axial position when the coil carries electric current flowing in a first direction and to the second axial position when the coil carries electric current flowing in a second direction opposite to the first direction. FIG. 3 shows an exemplifying situation where the collar element 301 is in the second axial position and thus a mechanical power transfer path is formed through the gear wheels 323 and 324. In the exemplifying gear system illustrated in FIG. 3, there are two selectable gear ratios. In a gear system according to another exemplifying and non-limiting embodiment of the invention, there are more than two selectable gear ratios and two or more magnetic actuators of the kind described above.

The magnetic actuator 300 may further comprise synchronizing means for synchronizing the rotation speeds of the collar element 301 and the gear wheel 321 or 323 prior to forming the torque transferring coupling between the collar element and the gear wheel under consideration. The synchronizing means may comprise for example elements having conical surfaces for contacting with corresponding conical surfaces attached to the gear wheels 321 and 323 prior to forming the above-mentioned torque transferring coupling. In FIG. 3, the conical surface attached to the gear wheel 321 is denoted with a reference number 326.

The specific examples provided in the description given above should not be construed as limiting the scope and/or the applicability of the appended claims. Lists and groups of examples provided in the description given above are not exhaustive unless otherwise explicitly stated.

What is claimed is:

1. A magnetic actuator comprising a collar element capable of transferring torque to and from a shaft surrounded by the collar element and capable of sliding in an axial direction with respect to the shaft, the collar element comprising indentations for locking in a torque transferring way to a counterpart when the collar element is in a first axial position with respect to the shaft, wherein:

the magnetic actuator comprises a coil surrounding the collar element so as to generate a circumferential current density, the collar element being capable of moving in the axial direction with respect to the coil, the collar element comprises permanent magnet material for generating an axial force for moving the collar element to the first axial position when the coil carries electric current flowing in a first direction and to a second axial position when the coil carries electric current flowing in a second direction opposite to the first direction.

2. A magnetic actuator according to claim 1, wherein the permanent magnet material has radially directed magnetization and the permanent magnet material is arranged to coaxially surround an axis of rotation of the collar element.

3. A magnetic actuator according to claim 2, wherein the collar element comprises a ferromagnetic support ring surrounding the permanent magnet material.

4. A magnetic actuator according to claim 1, wherein reluctance of a magnetic circuit comprising the permanent magnet material is dependent on the axial position of the collar element and the reluctance has a local minimum when the collar element is in the first axial position so that the collar element is retained at the first axial position by the permanent magnet material when there is no electric current in the coil.

5. A magnetic actuator according to claim 1, wherein reluctance of a magnetic circuit comprising the permanent magnet material is dependent on the axial position of the collar element and the reluctance has a local minimum when the collar element is in the second axial position so that the collar element is retained at the second axial position by the permanent magnet material when there is no electric current in the toroidal coil.

6. A magnetic actuator according to claim 1, wherein reluctance of a magnetic circuit conducting the magnetic flux produced by electric current of the toroidal coil is dependent on the axial position of the collar element, and the magnetic actuator further comprises a supply device for supplying measurement electric current to the toroidal coil and a processing system for detecting the axial position of the collar element on the basis of impedance constituted by the toroidal coil to the measurement electric current.

7. A magnetic actuator according to claim 1, wherein a bore of the collar element comprises spline teeth for matching corresponding spline teeth provided on an outer periphery of the shaft.

8. A gear system comprising:
   a gear-wheel assembly capable of producing gear ratios that are different from each other, and
   at least one magnetic actuator for controlling the gear-wheel assembly to produce a selected one of the gear ratios,
wherein the magnetic actuator comprises a collar element capable of transferring torque to and from a shaft surrounded by the collar element and capable of sliding in an axial direction with respect to the shaft, the collar element comprising indentations for locking in a torque transferring way to a counterpart when the collar element is in a first axial position with respect to the shaft, wherein:
   the magnetic actuator comprises a coil surrounding the collar element so as to generate a circumferential current density, the collar element being capable of moving in the axial direction with respect to the coil,
   the collar element comprises permanent magnet material for generating an axial force for moving the collar element to the first axial position when the coil carries electric current flowing in a first direction and to a second axial position when the coil carries electric current flowing in a second direction opposite to the first direction.

9. A gear system according to claim 8, wherein the gear-wheel assembly comprises a first shaft provided with first gear wheels, a second shaft provided with second gear wheels each being capable of transferring torque to and from the second shaft and meshing with a corresponding one of the first gear wheels, and the at least one magnetic actuator is suitable for determining which one of the first gear wheels is capable of transferring torque to and from the first shaft.

* * * * *